(No Model.)
J. P. JONES.
ROD PACKING.
No. 443,918.  Patented Dec. 30, 1890.
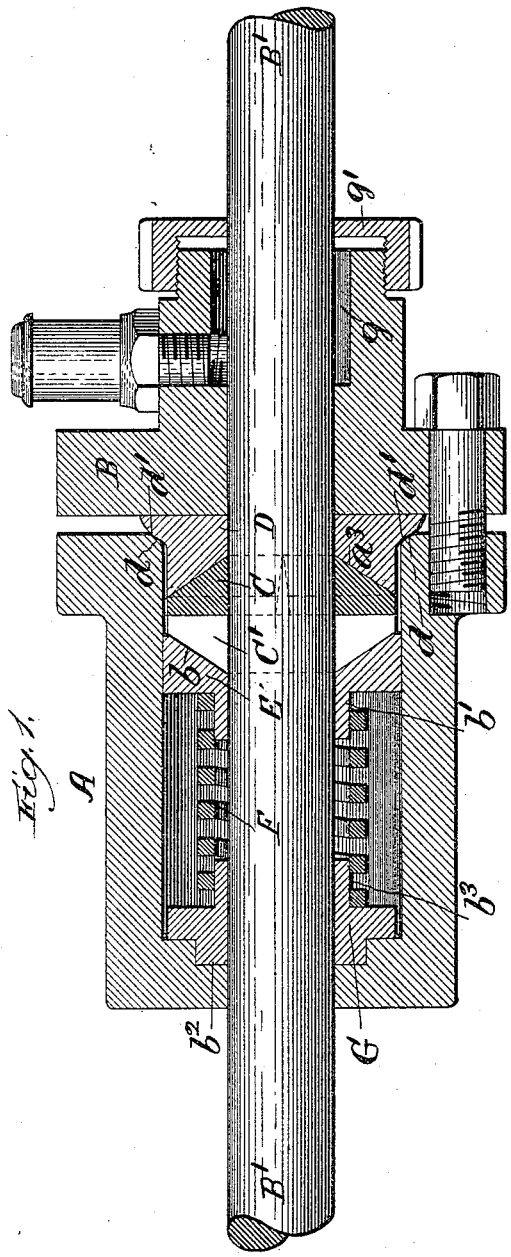
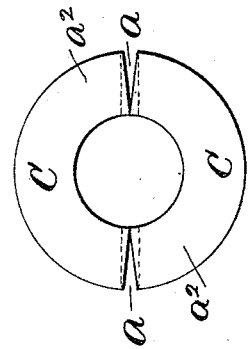
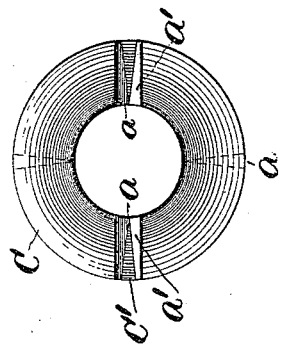
Witnesses:
Chas. E. Gaylord.
L. M. Freeman.
Inventor:
John P. Jones.
By L. B. Coupland & Co
Attys

UNITED STATES PATENT OFFICE.

JOHN P. JONES, OF CHICAGO, ILLINOIS, ASSIGNOR OF ONE-HALF TO JOHN W. CRYSLER, OF SAME PLACE.

ROD-PACKING.

SPECIFICATION forming part of Letters Patent No. 443,918, dated December 30, 1890.

Application filed June 24, 1889. Serial No. 315,393. (No model.)

*To all whom it may concern:*

Be it known that I, JOHN P. JONES, a citizen of the United States, residing at Chicago, in the county of Cook and State of Illinois, have invented certain new and useful Improvements in Rod-Packing, of which the following is a full, clear, and exact description, that will enable others to make and use the same, reference being had to the accompanying drawings, forming a part of this specification.

This invention relates to improvements in stuffing-box packing for piston and valve rods, and has for its object the providing of a metallic packing that will automatically compensate for the wear of the same, and adapted to be placed in position without disconnecting the rods.

Figure 1 is a longitudinal section of a stuffing-box and parts, showing the relative position and arrangement of the packing; Fig. 2, a plan and elevation of the packing-rings, looking at the outside; and Fig. 3, a plan looking at the inner joining face of one of the rings.

Referring to the drawings, A represents the stuffing-box, B the packing-gland, and B' the piston or valve rod.

Each of the two metal packing-rings C C' is in two semicircular parts or halves, such parts being so shaped that when joined together a ring is presented which in outline is similar to that of a conic frustum, the two packing-rings being exact duplicates, and when placed together in position on the rod they have the appearance of a double truncated cone, as illustrated in Fig. 1. The sectional half of ring C is shown with the usual section-lines, which are omitted in the companion ring C', the surface being left plain for the sake of clearness and just as it would appear with the separable half removed. The joining ends of the packing-rings are cut away in a diagonal plane from the inner edge outwardly, the line of separation gradually widening in the direction of the periphery and forming the V-shaped notch $a$. The joining or adjacent ends of the rings are also beveled outwardly, as at $a'$, in a direction nearly parallel to the line of axis—that is, starting from the inner edges of the meeting faces $a^2$ and running out at the conical edges, the adjacent surfaces being widest apart at their outer limit, as shown in Fig. 2. When the rings are placed in position on the rod, their extreme inner edges only meet, as shown in Fig. 3. By having the joining ends cut away and beveled, as described, the rings will draw together and continue to meet and compensate for the wear of the rod until the diameter is greatly reduced, when the old worn-out rings can be replaced by new ones. The companion rings when placed in the stuffing-box are adjusted to break joints, the line of separation being diametrically opposite each other, as indicated in Fig. 2.

The sleeve D of the packing-gland is cupped out to form the recess $a^3$, which corresponds in contour to the conical surface of the packing-ring C and forms a nesting-seat for the same.

The cap-ring E, located in back of and bearing against the inner sides of the packing-rings, is also provided with a cupped recess $b$, forming a seat for the companion ring C'.

The cap-ring E is provided with the sleeve part $b'$, which supports one end of the spiral spring F out of contact with the rod.

In the bottom of the stuffing-box is placed the spring-cap G, the part $b^2$ of which is recessed into the bottom, while the opposite side is provided with the sleeve $b^3$, supporting the inner end of the spring F. By this arrangement the packing-rings are secured and retained in their proper relative position and are kept close up to the rod, as they wear by the steam-pressure.

The edge of the mouth of the stuffing-box is rounded to provide the annular spherical bearing-surface $d$. The exterior surface of the sleeve on the packing-gland is provided with the annular spherical shoulder $d'$, which seats on the corresponding surface and forms a steam-tight ball-joint between the stuffing-box and packing-gland.

The outer end of the packing-gland is provided with the lubricating-chamber $g$, which is usually filled with some suitable absorbent, such as cotton waste, the removable screw-cap $g'$ affording convenient means of access to said chamber. This form of construction provides a packing that offers but little friction, is simple and cheap, and when worn out the old rings can be readily and conveniently replaced with new ones.

Having thus described my invention, what I claim as new, and desire to secure by Letters Patent, is—

1. A metal packing-ring in the form of a conic frustum, said ring consisting of two semicircular halves, the meeting edges whereof are cut away on lines diverging outwardly, and are also beveled in a direction lengthwise the axis of the ring, substantially as described.

2. A metal packing consisting of two companion rings in the form of conic frustums abutting base to base, said rings consisting each of two semicircular halves the meeting edges whereof are cut away on lines diverging outwardly and also beveled in a direction lengthwise the axis of the ring, in combination with a stuffing-box, a gland having a conical recess to receive one of the rings, and an oppositely-disposed cap-ring in the stuffing-box having a conical recess to receive the other ring, the mouth of the stuffing-box having an annular spherical bearing-surface, and a corresponding annular spherical surface on the gland, substantially as described.

JOHN P. JONES.

Witnesses:
L. M. FREEMAN,
L. B. COUPLAND.